US012600614B2

(12) United States Patent
Hansen

(10) Patent No.: US 12,600,614 B2
(45) Date of Patent: Apr. 14, 2026

(54) PRESSURE REGULATOR AND SPARKLING WATER MACHINE

(71) Applicant: CARBON8WATER, INC., Dover, DE (US)

(72) Inventor: Andreas Hansen, Dover, DE (US)

(73) Assignee: CARBON8WATER, INC., Dover, DE (US)

( * ) Notice: Subject to any disclaimer, the term of this patent is extended or adjusted under 35 U.S.C. 154(b) by 142 days.

(21) Appl. No.: 18/432,431

(22) Filed: Feb. 5, 2024

(65) Prior Publication Data

US 2025/0250155 A1 Aug. 7, 2025

(51) Int. Cl.
*B67D 1/12* (2006.01)
*B67D 1/00* (2006.01)
*B67D 1/04* (2006.01)

(52) U.S. Cl.
CPC ........... *B67D 1/125* (2013.01); *B67D 1/0003* (2013.01); *B67D 1/0406* (2013.01)

(58) Field of Classification Search
CPC ..... B67D 1/125; B67D 1/0003; B67D 1/0406
See application file for complete search history.

(56) References Cited

U.S. PATENT DOCUMENTS 3,504,399 A * 4/1970 Wolf .................... B29B 17/00 100/145
3,688,502 A * 9/1972 Hasen .................... F03B 5/00 60/645
3,848,631 A * 11/1974 Fallon .................... B67D 1/125 137/845
7,344,098 B2 * 3/2008 Balyberdin ......... B29B 17/0404 241/DIG. 31
2025/0250155 A1 * 8/2025 Hansen ................ B67D 1/0406

FOREIGN PATENT DOCUMENTS

CN 1449324 A * 10/2003 ............. B29B 17/00
CN 110060917 A * 7/2019 .......... H01J 49/0422
WO WO-2012169085 A1 * 12/2012 ............... A23L 2/40

* cited by examiner

*Primary Examiner* — Bob Zadeh
(74) *Attorney, Agent, or Firm* — Westbridge IP LLC

(57) ABSTRACT

Disclosed are a pressure regulator and a sparkling water machine. The pressure regulator includes: an arc flow path and a transiting chamber; a cross section of the arc flow path is configured to gradually increase from an input end of the arc flow path to an output end of the arc flow path, and the input end of the arc flow path is communicated with an inlet of the pressure regulator; and the transiting chamber is respectively communicated with the output end of the arc flow path and a discharging port of the pressure regulator.

13 Claims, 13 Drawing Sheets

PRESSURE REGULATOR AND SPARKLING WATER MACHINE

TECHNICAL FIELD

The present application relates to the technical field of gas-liquid mixing, and in particular to a pressure regulator and a sparkling water machine.

BACKGROUND

The sparkling water is a common and popular drink today. In the related art, the sparkling water is produced through the pressure tank mixing or pipeline instant mixing. In the pressure tank mixing method, carbon dioxide or the liquid at a preset pressure is pre-injected into the pressure tank, and the liquid or carbon dioxide at a high pressure is injected into the sparkling water mixing apparatus, so that carbon dioxide is dissolved in the liquid because of the high pressure shock.

In the pipeline instant mixing, the liquid and carbon dioxide are mixed in the pipeline and the sparkling water is directly discharged. Since the water pressure and the flow speed of the sparkling water in the mixed pipeline are both high, a throttle valve is added at the outlet of the sparkling water to adjust the pressure in the pipeline and the output flow rate.

This kind of throttle valve is usually equipped with a transiting chamber connected to the pipeline. By changing the outlet aperture size of the transiting chamber, the sparkling water is decompressed and decelerated. But when the high-pressure sparkling water in the pipeline is sprayed into the transiting chamber through the small hole, the flow space suddenly increases and the pressure drops sharply. The high-pressure water jets out at a high speed along a straight line and collides with the inner wall of the transiting chamber. The uncontrolled collision will cause the gas in the sparkling water to be released from the sparkling water during the collision process, which reduces carbonation level of the sparkling water and affects the taste.

SUMMARY

The main purpose of the present application is to provide a pressure regulator and a sparkling water machine, aiming to reduce the gas release loss caused by the movement and collision with high-pressure and high-flow speed during the discharge of the sparkling water along the high-pressure pipeline.

In order to achieve the above purpose, the present application provides a pressure regulator, including: an arc flow path and a transiting chamber;

- a cross section of the arc flow path is configured to gradually increase from an input end of the arc flow path to an output end of the arc flow path, and the input end of the arc flow path is communicated with an inlet of the pressure regulator; and
- the transiting chamber is respectively communicated with the output end of the arc flow path and a discharging port of the pressure regulator.

In an embodiment, the arc flow path is a spiral flow path.

In an embodiment, the pressure regulator further includes: a shell and a guiding member;

- the shell is formed with a pressure regulating chamber and the transiting chamber, the shell is provided with the inlet and the discharging port, and the pressure regulating chamber is communicated with the inlet; and
- the guiding member provided in the pressure regulating chamber, an outer sidewall of the guiding chamber is fitted with an inner sidewall of the pressure regulating chamber;
- at least one of the outer sidewall of the guiding member and the inner sidewall of the pressure regulating chamber is provided with a spiral groove to form the spiral flow path between the guiding member and the inner sidewall of the pressure regulating chamber.

In an embodiment, the pressure regulating chamber includes a pressure regulating section and a guiding section, and the inlet and the pressure regulating section are respectively provided on both sides of the guiding section away from each other;

- the guiding member includes a column guiding portion provided in the pressure regulating section and a tapered guiding portion, the spiral flow path is formed between the column guiding portion and the inner sidewall of the pressure regulating section, and an input end of the spiral flow path is communicated with the guiding section; and
- the tapered guiding portion is configured to gradually taper in a direction away from the column guiding portion, an end surface of the tapered guiding portion is an arc surface, and the tapered guiding portion is provided in the guiding section and spaced apart from a cavity wall of the guiding section.

In an embodiment, a limiting portion is provided in the transiting chamber, and one end of the guiding member away from the inlet is abutted against the limiting portion.

In an embodiment, the shell includes a first shell and a second shell, the first shell is provided with the pressure regulating chamber and the inlet, the second shell is provided with the transiting chamber and the discharging port, and the first shell is sealingly connected to the second shell.

In an embodiment, a tangent line of the output end of the arc flow path is tangent to a sidewall of the transiting chamber.

In an embodiment, the discharging port is opened on the sidewall of the transiting chamber.

In an embodiment, a ratio A of a sectional area of the output end of the arc flow path to a sectional area of the input end of the arc flow path satisfies the following condition: A is greater than or equal to 3.5, and A is less than or equal to 8.

In an embodiment, the pressure regulator further includes a sparkling structure provided at the discharging port of the pressure regulator.

The present application also provides a sparkling water machine, including: a sparkling water mixer and the pressure regulator;

- the sparkling water mixer formed with a mixed chamber, a rotatable impeller and an impacting portion located in a periphery of the impeller are provided in the mixed chamber; and
- the inlet of the pressure regulator is communicated with a liquid outlet of the sparkling water mixer.

In an embodiment, a mixed flow path is formed in the sparkling water mixer, and the the mixed chamber is communicated with a gas and liquid inlet of the sparkling water mixer through the mixed flow path; and

- the mixed flow path includes at least two mixed sections connected in sequence, the mixed section includes at least two sub flow paths connected in parallel, inlets of each of the sub flow paths in the same mixed section are communicated with each other to form an input end of the mixed section, and outlets of each of the sub flow paths in the same mixed section are communicated with each other to form an output end of the mixed section.

In an embodiment, at least one of the sub flow paths is provided with a diverting section and a gathering section sequentially communicated along the flow direction, the diverting section is configured to gradually move away from other sub flow paths in the same mixed section along the flow direction, and the gathering section is configured to gradually approach other sub flow paths in the same mixed section along the flow direction.

In an embodiment, at least one diverter is provided in the mixed section, and both ends of each of the diverter are respectively formed with the sub flow paths.

In an embodiment, a cross section of the inlet end is configured to gradually increase along the flow direction.

In an embodiment, a cross section of the outlet end is configured to gradually decrease along the flow direction.

The present application provides a pressure regulator that can be installed at the discharge port of the sparkling water. The pressure regulator is provided with an arc flow path and a transiting chamber, the arc flow path can be a spiral flow path, a semicircular flow path or an oval flow path, etc., and the cross section of the arc flow path gradually increases from the input end to the output end of the arc flow path. When the sparkling water enters the arc flow path, it flows along the arc flow path and continues to change the flow direction. Since the cross section of the arc flow path gradually increases, the water pressure and the flow speed of the sparkling water gradually decrease. In this way, the sparkling water can be prevented from strongly colliding with the wall of the transiting chamber resulting from the high water pressure and flow speed when the sparkling water enters the transiting chamber. That is, through the setting of the arc flow path, the sparkling water is decompressed and decelerated before entering the transiting chamber, thereby reducing the release loss caused by the movement and collision with high-pressure and high-flow speed during the discharge of the sparkling water along the high-pressure pipeline, which ensures the gas dissolved amount of the sparkling water, and carbonated water prepared and discharged has a high carbonation concentration. The flow path is an arc shape, so that sparkling water with high-pressure and high-speed can be prevented from shooting directly from the input end to the output end, which may cause the flow path to be unable to decompress and decelerate.

In addition, the transiting chamber can further reduce and decelerate the pressure, and can also convert the chaotic fluid rushing out from the arc flow path into a regular continuous fluid and discharge it from the outlet of the pressure regulator. The sparkling water flow rate of the outlet can be controlled through controlling the opening degree of the outlet of the transiting chamber, which is helpful for the sparkling water machine to distribute the sparkling water flowing out of the outlet, controlling and maintaining the pressure at the outlet, and improving the safety of the sparkling water machine.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
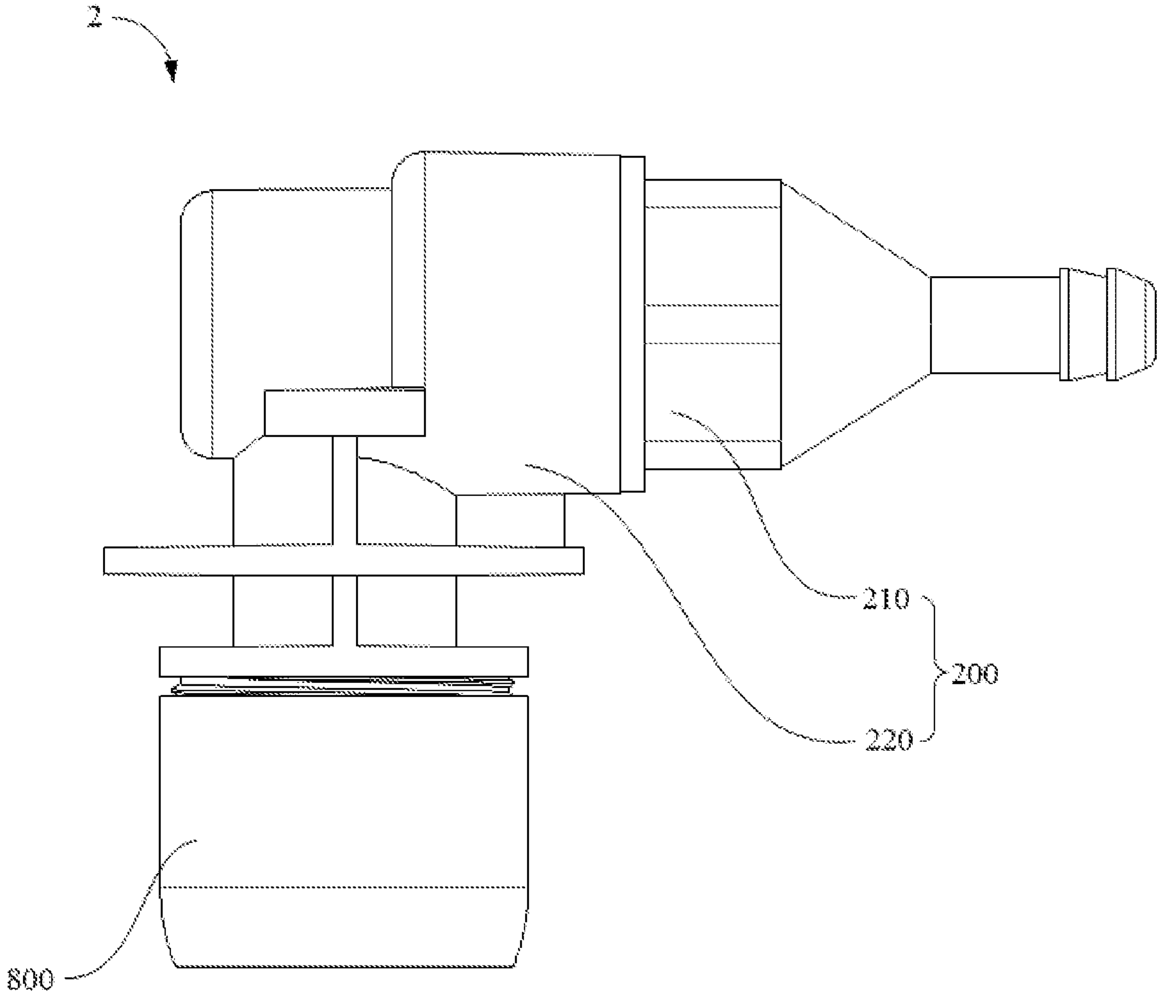
FIG. 1 is a structural view of a pressure regulator according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In the description of the embodiments of the present application, unless otherwise explicitly stipulated and limited, the terms “connected” d “fixed” should be understood in a broad sense. For example, it can be a fixed connection, a detachable connection or an integrated connection, a mechanical connection or an electrical connection, a direct connection or an indirect connection through an intermediate medium, a connection within two components or an interaction between two components, unless explicitly specified otherwise. For those skilled in the art, the specific meanings of the above terms in the embodiments of the present application can be understood in specific situations.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a pressure regulator 2.

Figure 2:
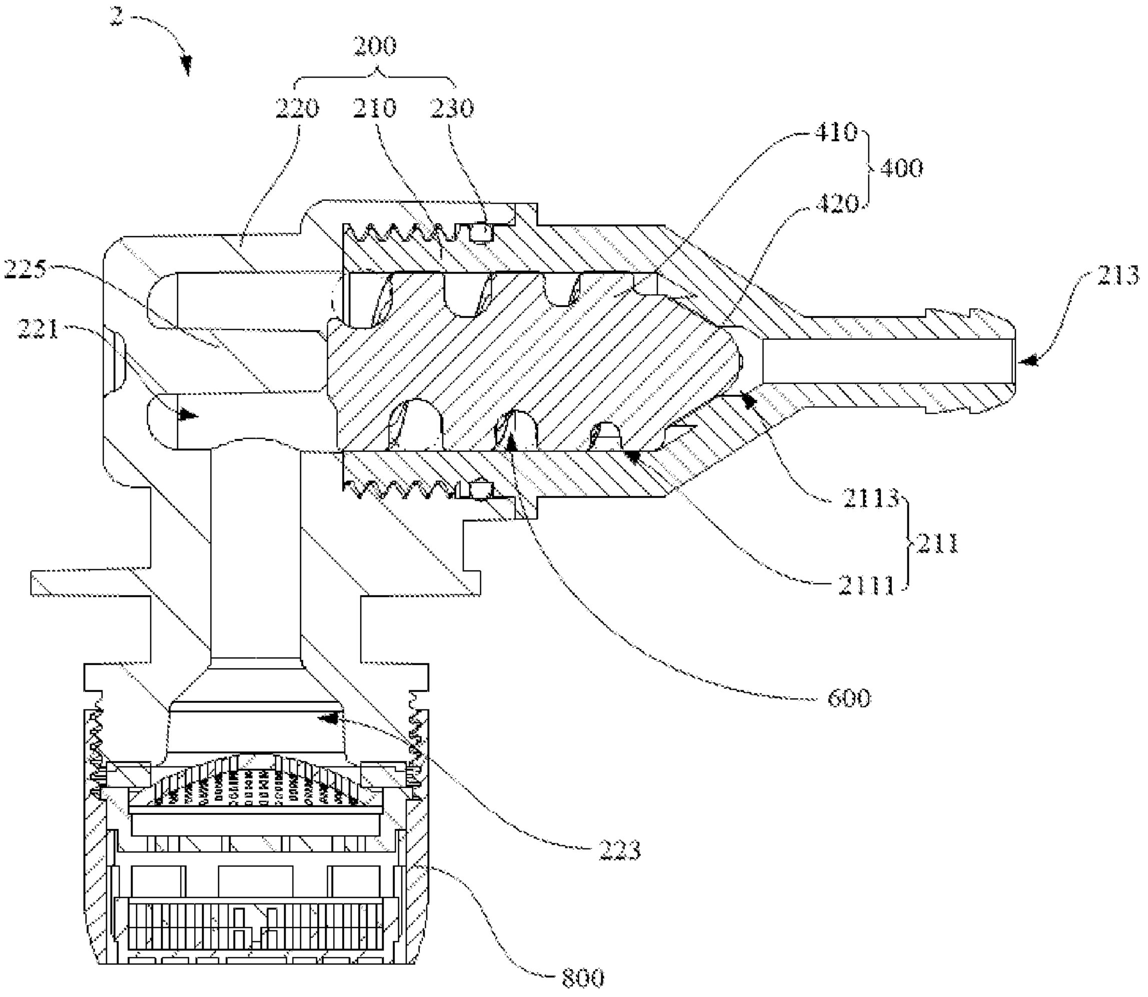
FIG. 2 is a cross sectional view of the pressure regulator according to an embodiment of the present application.
Figure 3:
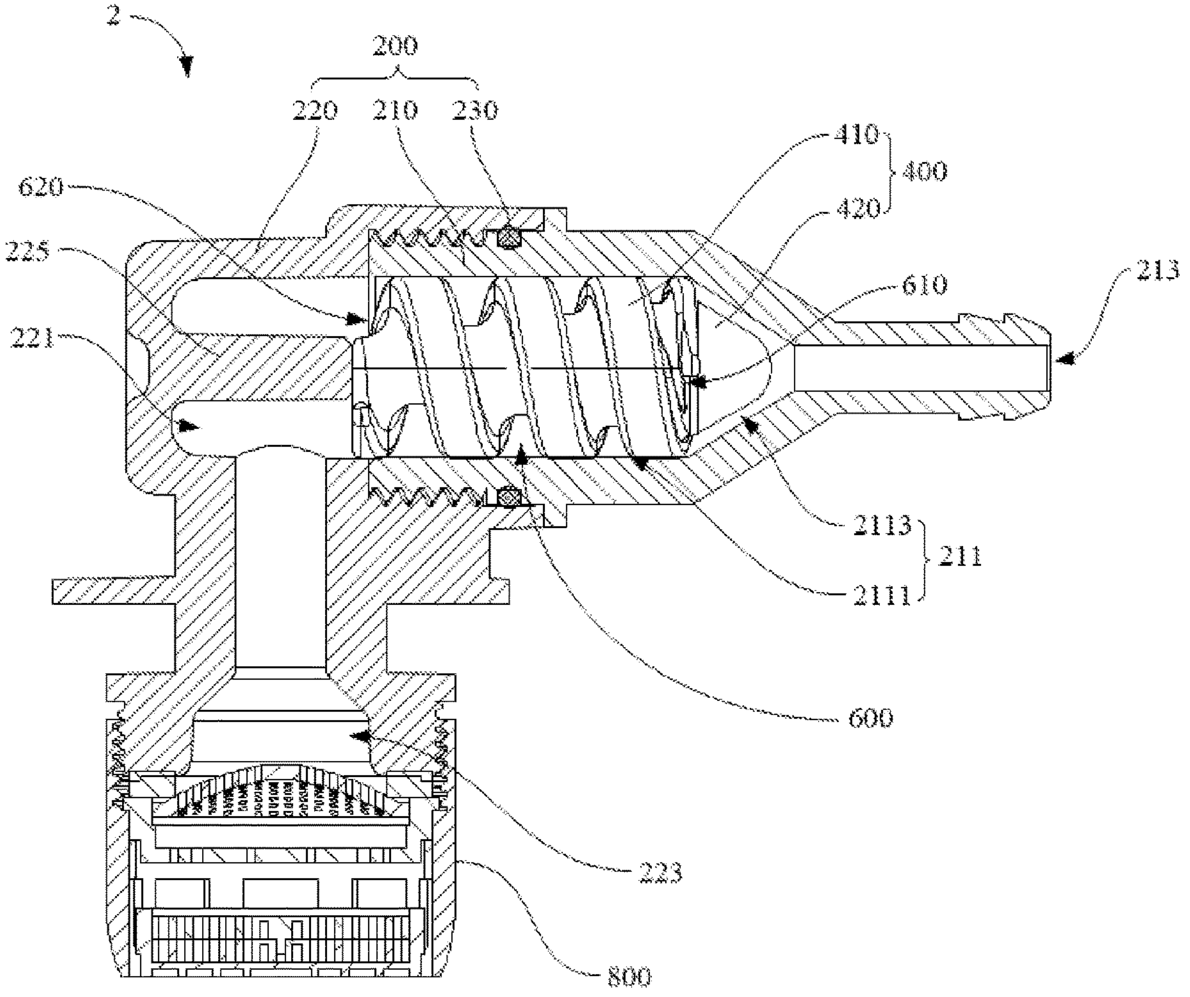
FIG. 3 is a cross sectional view showing a complete guiding member of the pressure regulator in FIG. 2.
Figure 4:
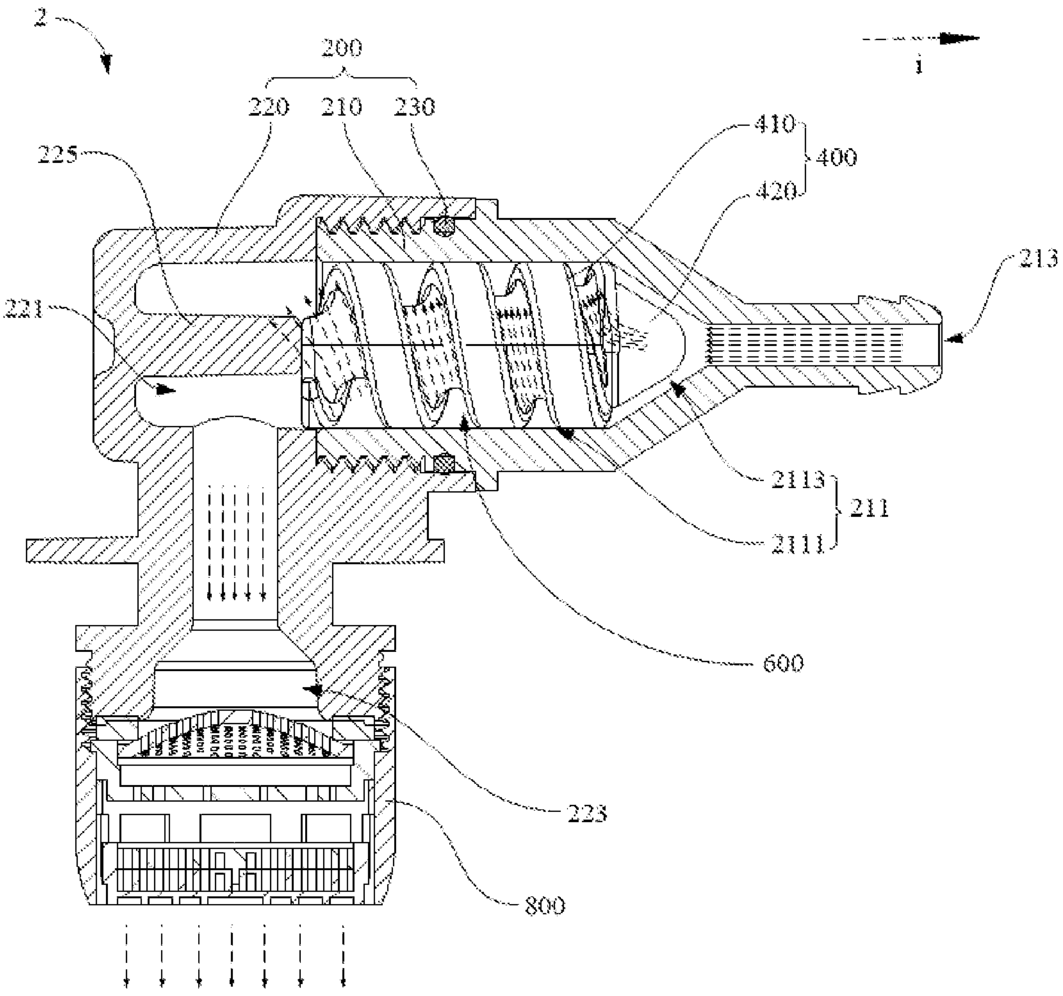
FIG. 4 is a schematic view of a flow direction when the pressure regulator is applied according to an embodiment of the present application.
Figure 5:
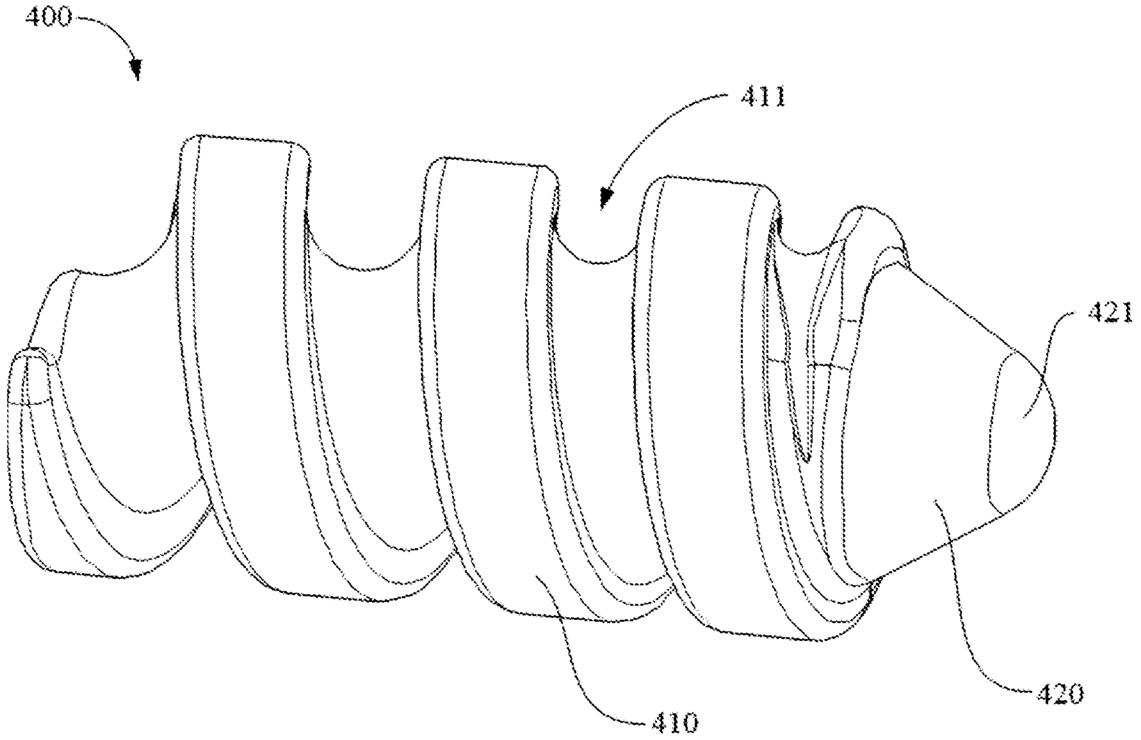
FIG. 5 is a structural view of the guiding member in the pressure regulator according to an embodiment of the present application.

Please refer to FIG. 1 to FIG. 3, in an embodiment, the pressure regulator 2 is formed with: an arc flow path 600 and a transiting chamber 221.

A cross section of the arc flow path 600 gradually increases from an input end 610 of the arc flow path 600 to an output end 620 of the arc flow path 600, and the input end 610 of the arc flow path 600 is communicated with an inlet 213 of the pressure regulator 2; and the transiting chamber 221 is respectively communicated with the output end 620 of the arc flow path 600 and an discharging port 223 of the pressure regulator 2.

The pressure regulator 2 provided in the present application can be applied in the sparkling water machine to decompress and decelerate the mixed sparkling water. The arc flow path 600 and the transiting chamber 221 are formed in the pressure regulator 2, and the arc flow path 600 is provided with the input end 610 and the output end 620. The arc flow path 600 can be a flow path structure on a same plane, such as a semicircular flow path, an oval flow path, etc., or can be a three-dimensional flow path structure, such as a spiral flow path. The arc flow path 600 can be formed by using a curved horn pipe, or can be formed by a matching structure of a shell 200 and a guiding member 400 in the following embodiment, which is not limited here.

The cross section of the arc flow path 600 gradually increases from the input end 610 to the output end 620. In this way, when the sparkling water enters the arc flow path 600, the water pressure and the flow speed of the sparkling water gradually decrease, the sparkling water is guided by the arc flow path 600 to continue changing a flow direction i, and a straight flow from the inlet 213 of the pressure regulator 2 is changed to a tangential direction along the arc flow path 600. In this way, the sparkling water can be prevented from strongly colliding with the wall of the transiting chamber 221 resulting from the high water pressure and flow speed when the sparkling water enters the transiting chamber 221, and the release loss of the gas in the sparking water can be reduced. In addition, the arc flow path 600 prevents the sparking water with high pressure and high speed directly shooting from the input end 610 to the output end 620, which may otherwise weaken the action of decompressing and decelerating.

When the sparkling water flows from the output end 620 of the arc flow path 600 into the transiting chamber 221, the transiting chamber 221 is configured to further decompress and decelerate, and a chaotic fluid rushing out from the arc flow path 600 can be converted into a regular continuous fluid and discharged from the discharging port 223 of the pressure regulator 2. The sparkling water flow rate flowing out of the discharging port 223 can also be controlled by controlling the opening degree of the discharging port 223 of the transiting chamber 221, which is beneficial for the sparkling water machine in distributing the sparkling water flowing out of the discharging port 223, and controlling and maintaining the pressure at the discharging port 223, thereby improving the safety of the sparkling water machine.

Therefore, it can be understood that the present application provides the pressure regulator 2 that can be arranged at the discharging port 223 of the sparkling water. The pressure regulator 2 is provided with the arc flow path 600 and the transiting chamber 221, the arc flow path 600 can be a spiral flow path, a semicircular flow path or an oval flow path, etc., and the cross section of the arc flow path 600 gradually increases from the input end 610 of the arc flow path 600 to the output end 620 of the arc flow path 600. When entering the arc flow path 600, the sparkling water flows along the arc flow path 600 and continues to change the flow direction i. Since the cross section of the arc flow path 600 gradually increases, the water pressure and the flow speed of the sparkling water gradually decrease. In this way, the sparkling water can be prevented from strongly colliding with the wall of the transiting chamber 221 resulting from the high water pressure and flow speed when the sparkling water enters the transiting chamber 221. That is, through the setting of the arc flow path 600, the sparkling water is decompressed and decelerated before entering the transiting chamber 221, thereby reducing the release loss caused by the movement and collision with high-pressure and high-flow speed during the discharge of the sparkling water along the high-pressure pipeline, which ensures the gas dissolved amount of the sparkling water, and carbonated water prepared and discharged has a high carbonation concentration. The flow path is in the arc shape, so that the sparkling water with high-pressure and high-speed can be prevented from shooting directly from the input end to the output end, which may otherwise weaken the action of decompressing and decelerating.

In addition, the transiting chamber 221 is configured to further decompress and decelerate, and the chaotic fluid rushing out from the arc flow path 600 can be converted into the regular continuous fluid and discharged from the discharging port 223 of the pressure regulator 2. The sparkling water flow rate flowing out of the discharging port 223 can also be controlled by controlling the opening degree of the discharging port 223 of the transiting chamber 221, which is beneficial for the sparkling water machine in distributing the sparkling water flowing out of the discharging port 223, and controlling and maintaining the pressure at the discharging port 223, thereby improving the safety of the sparkling water machine.

Please refer to FIG. 2 and FIG. 3, in an embodiment, the arc flow path 600 is a spiral flow path.

In an embodiment, the arc flow path 600 is the spiral flow path. When a distance between the inlet 213 of the pressure regulator 2 and the transiting chamber 221 is constant, the spirally extending flow path structure can increase a length of the arc flow path 600, thereby extending a flow route of the sparkling water. On the contrary, when the length of the flow path 600 needs to be preset, the arc flow path 600 is set to the spiral structure, which can reduce the space occupied by the arc flow path 600 and reduce the size of the pressure regulator 2. In addition, when the length of the arc flow path 600 is extended, the cross sectional change trend of the arc flow path 600 can be made more gentle, which reduces an acceleration of the sparkling water in the process of decompression and deceleration, thereby reducing the gas release and loss when the sparkling water flows in the arc flow path 600. When the cross sectional change trend of the arc flow path 600 is determined, extending the length of the arc flow path 600 can increase the decompression and the deceleration amplitude of the sparkling water, and lessen the water pressure and speed of the sparkling water when entering the transiting chamber 221 to reduce the gas release and loss after the sparkling water enters the transiting chamber 221.

Please refer to FIG. 2 and FIG. 3, in an embodiment, the pressure regulator 2 includes the shell 200 and the guiding member 400. A pressure regulating chamber 211 and the transiting chamber 221 are formed in shell 200, the shell 200 is provided with the inlet 213 and the discharging port 223, and the pressure regulating chamber 211 is communicated with the inlet 213. The guiding member 400 is located in the pressure regulating chamber 211, and an outer sidewall of the guiding chamber is fitted with an inner sidewall of the pressure regulating chamber 211.

At least one of the outer sidewall of the guiding member 400 and the inner sidewall of the pressure regulating chamber 211 is provided with a spiral groove 411 to form the spiral flow path between the guiding member 400 and the inner sidewall of the pressure regulating chamber 211.

In an embodiment, the pressure regulator 2 includes the shell 200 and the guiding member 400 provided in the shell 200. The pressure regulating chamber 211 and the transiting chamber 221 communicated with the pressure regulating chamber 211 are formed in the shell 200, and the shell 200 is provided with the inlet 213 communicated with the pressure regulating chamber 211 and the discharging port 223 communicated with the transiting chamber 221. An profile of the pressure regulating chamber 211 can be a cylindrical structure, a conical barrel structure, a round table structure or a combination of different shapes. One end of the pressure regulating chamber 211 towards the transiting chamber 221 is communicated with the transiting chamber 221. The inlet 213 provided on the shell 200 can be penetrated to the sidewall of one end of the pressure regulating chamber 211 away from the transiting chamber 221, or can be penetrated to the end of the pressure regulating chamber 211 away from the transiting chamber 221.

The guiding member 400 is provided in the pressure regulating chamber 211, and a shape of the guiding member 400 is matched with the shape of the pressure regulating chamber 211. The spiral groove 411 can be opened on the outer sidewall of the guiding member 400, on the inner sidewall of the pressure regulating chamber 211, or on the outer sidewall of the guiding member 400 and the inner sidewall of the pressure regulating chamber 211 at the same time. In this way, the outer sidewall of the guiding member 400 is fitted with the inner sidewall of the pressure regulating chamber 211, so that there is only a gap at the spiral groove 411 to form the spiral flow path. When opened on the outer sidewall of the guiding member 400 and the inner sidewall of the pressure regulating chamber 211 at the same time, the spiral grooves 411 are correspondingly provided, or the spiral groove 411 on the guiding member 400 is engaged with the spiral groove 411 on the inner sidewall of the pressure regulating chamber 211. That is, the sparkling water can flow through the guiding member 400 and the spiral groove 411 on the inner sidewall of the pressure regulating chamber 211 in sequence.

Compared with the method of setting a spiral tube in the pressure regulator 2, structure of the pressure regulator 2 is more stable and less prone to bending and deformation in the method that the spiral flow path is formed by the cooperation of the shell 200 and the guiding member 400 in the pressure regulator 2.

Please refer to FIG. 2 to FIG. 5, in an embodiment, the pressure regulating chamber 211 includes a pressure regulating section 2111 and a guiding section 2113. The inlet 213 and the pressure regulating section 2111 are respectively located on both sides of the guiding section 2113 away from each other, the guiding member 400 includes a column guiding portion 410 and a tapered guiding portion 420, the column guiding portion 410 is provided in the pressure regulating section 2111, the spiral flow path is formed between the column guiding portion 410 and an inner sidewall of the pressure regulating section 2111, and the input end 610 of the spiral flow path is communicated with the guiding section 2113.

The tapered guiding portion 420 gradually tapers in a direction away from the column guiding portion 410, and an end surface of the tapered guiding portion 420 is an arc surface 421. The tapered guiding portion 420 is provided in the guiding section 2113 and is spaced apart from a cavity wall of the guiding section 2113.

In an embodiment, the guiding member 400 in the pressure regulator 2 includes the column guiding portion 410 and the tapered guiding portion 420 connected to the column guiding portion 410. The column guiding portion 410 can be in the shape of cylinder, elliptic cylinder, prism, circular truncated cone, etc. The tapered guiding portion 420 is provided at one end of the column guiding portion 410. The tapered guiding portion 420 gradually tapers in the direction away from the column guiding portion 410, and can be in a shape such as a pyramid. The end surface of the tapered guiding portion 420 is the arc surface 421.

The guiding member 400 is entirely installed in the shell 200 of the pressure regulator 2 and is located in the pressure regulating chamber 211. The pressure regulating chamber 211 is defined to have two sections, that is, the pressure regulating section 2111 for accommodating the column guiding portion 410 and the guiding section 2113 for accommodating the tapered guiding portion 420. A shape profile of the pressure regulating section 2111 is matched with the column guiding portion 410, so that the inner sidewall of the pressure regulating section 2111 can be fitted with the outer sidewall of the column guiding portion 410. The spiral groove 411 can be opened on the outer sidewall of the guiding member 400, on the inner section of the pressure regulating section 2111, or on the outer sidewall of the guiding member 400 and the inner sidewall of the pressure regulating section 2111 at the same time. The spiral flow path is formed between the column guiding portion 410 and the inner sidewall of the pressure regulating section 2111.

A profile size of the guiding section 2113 is larger than a profile size of the tapered guiding portion 420, so that the tapered guiding portion 420 and the inner side wall of the guiding section 2113 are spaced apart to form a diverting zone, and the diverting zone is communicated with the input end 610 of the spiral flow path. The profile shape of the guiding section 2113 can be matched with the shape of the tapered guiding portion 420, that is, the cross section of the guiding section 2113 gradually tapers in a direction away from the pressure regulating section 2111. The profile shape of the guiding section 2113 can also be different from the shape of the guiding section 2113, as long as the inner side wall of the guiding section 2113 is spaced apart from the tapered guiding portion 420. For example, the profile of the guiding section 2113 can be the same as the profile of the pressure regulating section 2111 or can be other profile shapes.

In an embodiment, the inlet 213 opened on the shell 200 is also provided on one side of the guiding section 2113 away from the pressure regulating section 2111, and the inlet 213 is provided opposite to the arc surface 421 of the end portion of the tapered guiding portion 420. At this time, when the sparkling water enters the pressure regulating section 2111 from the inlet 213, the water flow impacts on the arc surface 421 of the tapered guiding portion 420, so that the water flow is dispersed and flows into the diverting zone between the tapered guiding portion 420 and the inner side wall of the guiding section 2113. The arc surface 421 can also disperse the impact force of water flow and avoid the stress concentration.

The water entering the diverting zone will gradually flow into the spiral flow path from the input end 610 of the spiral flow path, then rotate along the spiral flow path and flow to the output end 620, and flow out from the discharging port 223 of the shell 200 through the transiting chamber 221. During this process, the flow direction is changed to a tangential direction along the spiral flow path, and as the spiral flow path gradually expands, the pressure of the water flow gradually decreases, which can decompress and decelerate the sparkling water.

Please refer to FIG. 2 and FIG. 3, in an embodiment, a limiting portion 225 is provided in the transiting chamber 221, and one end of the guiding member 400 away from the inlet 213 is abutted against the limiting portion 225.

In an embodiment, the limiting portion 225 is provided in the transiting chamber 221. The limiting portion 225 may be provided on a bottom wall of the transiting chamber 221 opposite to the guiding member 400, and extends toward one side of the pressure regulating chamber 211 to contact the guiding member 400. The limiting portion 225 can also be provided on the sidewall of the transiting chamber 221 adjacent to the pressure regulating chamber 211 to be abutted against the guiding member 400 and to avoid the output end 620 of the spiral flow path. The limiting portion 225 plays a limiting role on the guiding member 400, prevents the guiding member 400 from moving to one side of the transiting chamber 221, and maintains a position stability of the guiding member 400 and the structural stability of the pressure regulator 2. In this way, even when the guiding member 400 is impacted by the sparkling water or other external forces, the limiting portion 225 will resist the guiding member 400 to keep the position of the guiding member 400 stable.

Please refer to FIG. 1 to FIG. 3, in an embodiment, the shell 200 includes a first shell 210 and a second shell 220. The first shell 210 is provided with the pressure regulating chamber 211 and the inlet 213. The second shell 220 is provided with the transiting chamber 221 and the discharging port 223. The first shell 210 is sealingly connected to the second shell 220.

In an embodiment, the shell 200 includes the first shell 210 and the second shell 220 detachably connected to the first shell 210. The first shell 210 is formed with the pressure regulating chamber 211 and the inlet 213 communicated with the pressure regulating chamber 211. The first shell 210 is provided with a first connecting portion for connecting to the second shell 220, and the first connecting portion is provided with a through port communicated with the pressure regulating chamber 211. The second shell 220 is formed with the transiting chamber 221 and the discharging port 223 communicated with the transiting chamber 221. The second shell 220 is provided with a second connecting portion for connecting to the first shell 210, and the second connecting portion is provided with a communication port communicated with the transiting chamber 221. The first shell 210 is connected to the second shell 220 through the first connecting portion and the second connecting portion. The first connecting portion can be sleeved with the second connecting portion; or the external thread is in the outer sidewall of the first connecting portion, and the internal thread is in the inner sidewall of the second connecting portion, so that the first connecting portion is threaded to the second connecting portion; or the external thread is in the outer sidewall of the second connecting portion, and the internal thread is in the inner sidewall of the first connecting portion. In addition, the snap connection or the bond connection can also be used. The shell 200 is set as the first shell 210 and the second shell 220 detachably connected to the first shell 210, which facilitates the disassembly and assembly of the guiding member 400, and also facilitates a cleaning of the transiting chamber 221, the pressure regulating chamber 211, the spiral flow path, etc. in the shell 200.

In an embodiment, the shell 200 also includes a sealing structure 230. The sealing structure 230 may be a sealing ring or a sealant. The sealing structure 230 is provided between the first connecting portion and the second connecting portion, which can improve a sealing performance when the first shell 210 is connected to the second shell 220, and avoid a water leakage or a gas leakage.

In addition, in an embodiment, the limiting portion 225 can be provided in the second shell 220, so that when the pressure regulating valve is assembled, the limiting portion 225 can limit the guiding member 400 to prevent the guiding member 400 from moving into the transiting chamber 221.

In an embodiment, the output end 620 of the arc flow path 600 is tangent to the sidewall of the transiting chamber 221.

It can be understood that when sparkling water flows into the arc flow path 600, the flow pressure, the flow speed and the flow direction will all change. When the sparkling water flows out from the arc flow path 600, under an action of inertia, the flow direction of the water will be roughly the same as the tangential direction of the output end 620 of the arc flow path 600. In an embodiment, the tangent of the output end 620 of the arc flow path 600 is approximately tangent to the sidewall of the transiting chamber 221. In this way, when the sparkling water flows out from the arc flow path 600, it will flow along the sidewall of the transiting chamber 221 under the action of inertia, which prevents the sparkling water from entering the transiting chamber 221 and then rushing to the wall of the transiting chamber 221. That is, the sparkling water can flow into the transiting chamber 221 more gently, reducing the impact, thereby reducing the gas release in the sparkling water. In addition, the inner wall of the transiting chamber 221 also plays a guiding role to prevent the sparkling water from splashing in the transiting chamber 221 or directly rushing to the discharging port 223.

Please refer to FIG. 2 and FIG. 3, in an embodiment, the discharging port 223 is opened on the sidewall of the transiting chamber 221.

In an embodiment, the discharging port 223 for discharging the sparkling water in the pressure regulator 2 is on the sidewall of the transiting chamber 221 to prevent the discharging port 223 from being opposite to the output end 620 of the arc flow path 600. In this way, the sparkling water can be prevented from directly rushing to the discharging port 223 after flowing out from the output end 620 of the arc flow path 600, which otherwise may cause the inability to adjust the output flow rate and the pressure of the discharging port 223 through the transiting chamber 221. The discharging port 223 is arranged on the sidewall of the transiting chamber 221, so that the sparkling water will stay in the transiting chamber 221, and further decompress and decelerate in the transiting chamber 221. The chaotic fluid rushing out from the spiral flow path will be converted into the regular continuous fluid. Therefore, the flow rate of the sparkling water flowing out of the discharging port 223 can be adjusted by controlling the opening degree of the discharging port 223, and the pressure at the discharging port 223 can be controlled and maintained.

In an embodiment, the tangent line of the output end 620 of the arc flow path 600 is approximately tangent to the sidewall of the transiting chamber 221, and the discharging port 223 is provided at the sidewall of the transiting chamber 221. In this way, the transiting chamber 221 can play a better role in buffering the sparkling water, so that the sparkling water can be stably discharged from the discharging port 223.

In an embodiment, the ratio A of the sectional area of the output end 620 of the arc flow path 600 to the sectional area of the input end 610 satisfies: $3.5 \leq A \leq 8$, where A can take values like 3.5, 4, 4.5, 5, 5.5, 6, 6.5, 7, 7.5, 8 or any value between 3.5 and 8. It can be selected based on input properties of some parameters such as the water pressure, the flow speed and the flow rate of the sparkling water, or based on input parameters such as the gas pressure and the water pressure during the production to determine an appropriate sectional area ratio. In this way, the arc flow path 600 can fully decompress and decelerate the sparkling water, so that when sparkling water with high-pressure and high-speed flows through the arc flow path 600, it can enter the transiting chamber 221 relatively smoothly and gently. For example, the sectional area of input end 610 can be approximately 2.8 $mm^2$, and the sectional area of output end 620 can be approximately 15 $mm^2$.

Please refer to FIG. 1 to FIG. 4, in an embodiment, the pressure regulator 2 further includes a sparkling structure 800 provided at the discharging port 223 of the pressure regulator 2.

In an embodiment, the pressure regulator 2 also includes the sparkling structure 800 provided at the discharging port 223 of the pressure regulator 2. A sparkling equipment of appropriate specifications may be selected and installed at the discharging port 223 of the pressure regulator 2, or the sparkling structure 800 may be directly processed on the pressure regulator 2. In this way, when the sparkling water enters the sparkling structure 800 from the transiting chamber 221, it will be evenly dispersed and buffered by the sparkling structure 800, thus the flow speed of the sparkling water can be reduced, and the sparkling water with a gentle flow speed can be obtained to avoid the user from being greatly impacted when obtaining the water.

The present application also provides a sparkling water machine, including a sparkling water mixer 1 and the pressure regulator 2 as in any of the previous embodiments. A mixed chamber 20 is formed in the sparkling water mixer 1, and the mixed chamber 20 is provided with a rotatable impeller 21 and an impacting portion 23 located at a periphery of the impeller 21. The inlet 213 of pressure regulator 2 is communicated with a liquid outlet 50 of the sparkling water mixer 1.

The sparkling water machine provided in the present application can be used to dissolve the gas in the liquid to produce the sparkling water. For ease of explanation, carbon dioxide and the water are used as examples in the embodiments of the present application, of course, the sparkling water mixer 1 provided in the present application can also be used to mix other types of gases and liquids. The sparkling water machine includes the sparkling water mixer 1 and the pressure regulator 2 connected to the liquid outlet 50 of the sparkling water mixer 1. The sparkling water machine can also include a water supply structure and a gas supply structure, so that the water supply structure and the gas supply structure are connected to the sparkling water mixer 1, and the liquid and carbon dioxide gas can be added to the sparkling water mixer 1. The water supply structure and gas supply structure may not be part of the sparkling water machine, but may be connected to the sparkling water machine as an external gas source and water source.

The sparkling water mixer 1 is provided with the mixed chamber 20, the mixed chamber 20 is provided with the impeller 21, and the impacting portion 23 is provided at the periphery of the impeller 21. The impacting portion 23 is spaced apart from the impeller 21 to avoid affecting the rotation of the impeller 21. When the gas-liquid mixture enters the mixed chamber 20 from a mixed flow path 10, the gas-liquid mixture will impact the impeller 21 and drive the impeller 21 to rotate. Due to the different densities of carbon dioxide and water, the gas-liquid mixture in the mixed chamber 20 will tend to form a stratified configuration under the action of gravity, resulting in gas-liquid stratification, thereby reducing the total contact area between the gas phase and the liquid phase, reducing the opportunity for carbon dioxide to dissolve in the liquid. When the impeller 21 rotates, the blades arranged along the peripheral direction of the impeller 21 will rotate accordingly to continuously separate and equalize the gas-liquid two-phase flow and destroy the gas-liquid stratification to form a finely dispersed system and make small droplets or bubbles evenly dispersed in the continuous phase, so that carbon dioxide can fully contact the liquid, improving the dissolution effect of carbon dioxide.

In addition, after the gas-liquid mixture enters the mixed chamber 20, part of the gas-liquid mixture will also impact on the impacting portion 23. Under a centrifugal action of the impeller 21 when rotating, the gas-liquid mixture impacting on the impeller 21 will also be thrown towards the impacting portion 23 and collide with the impacting portion 23. The gas-liquid mixture itself has a high momentum, and part of the gas-liquid mixture relies on the centrifugal force of the impeller 21, which causes the gas-liquid mixture to collide with the impacting portion 23 at a high speed. The part of the gas-liquid mixture that collides the impacting portion 23 will stop flowing instantly and convert its own kinetic energy into impulse. The gas-liquid mixture will undergo a higher momentum change in a short period of time, and an impact force much higher than the normal pressure will be formed on the impacting portion 23, so that a solution pressure much higher than the normal pressure is instantly generated, which increases the solubility of carbon dioxide in the liquid.

When the part of the gas-liquid mixture that collides the impacting portion 23 stop flowing instantly, the other gas-liquid mixtures immediately adjacent to this part of the gas-liquid mixture will maintain their original motion state due to inertia, thus being able to compress the part of the gas-liquid mixture that collides the impacting portion 23, so that a high-pressure surface with high energy density and very large local pressure is formed at the impacting portion 23, which can also increase the solubility of carbon dioxide in the liquid.

Using the sparkling water mixer for gas-liquid mixing eliminates the need to use high-pressure carbon dioxide of up to 5-7 MPa to pour into the liquid storage bottle and mix with the liquid, and avoids the problem of the liquid storage bottle being flushed or broken due to the use of high-pressure carbon dioxide technical solutions. Besides, this solution completely cancels the liquid storage bottle and adopts the instant mixing method. The user can directly obtain the sparkling water at the sparkling water mixing apparatus without any other operations, thus improving the safety and convenience of the sparkling water mixing apparatus.

It can be understood that when carbon dioxide and water are mixed through the sparkling water mixer 1, then the sparkling water is discharged from the sparkling water mixer 1, there may also be some carbon dioxide that is not dissolved in the water, and the undissolved carbon dioxide will also be discharged from the liquid outlet 50 of the mixer 1 together with the mixed sparkling water. Therefore, the liquid outlet 50, the liquid inlet 70, and the gas inlet 60, etc. provided in the embodiments of the present application are not limited to the position that can only be used to circulate pure liquid or pure gas. According to different use environments and needs, the gas-liquid mixture, the solid-liquid mixture, and the solid-gas mixture or other types of mixtures can also be circulated.

The sparkling water mixed by the sparkling water mixer 1 enters the pressure regulator 2, and is discharged after pressure regulation and deceleration by the pressure regulator 2. The specific structure and implementation of the pressure regulator 2 refer to the foregoing embodiments and will not be described here.

Since the sparkling water machine provided in the present application applies all the technical means in any of the foregoing embodiments, it has at least all the beneficial effects brought by all the foregoing technical solutions, which will not be described here.

Figure 6:
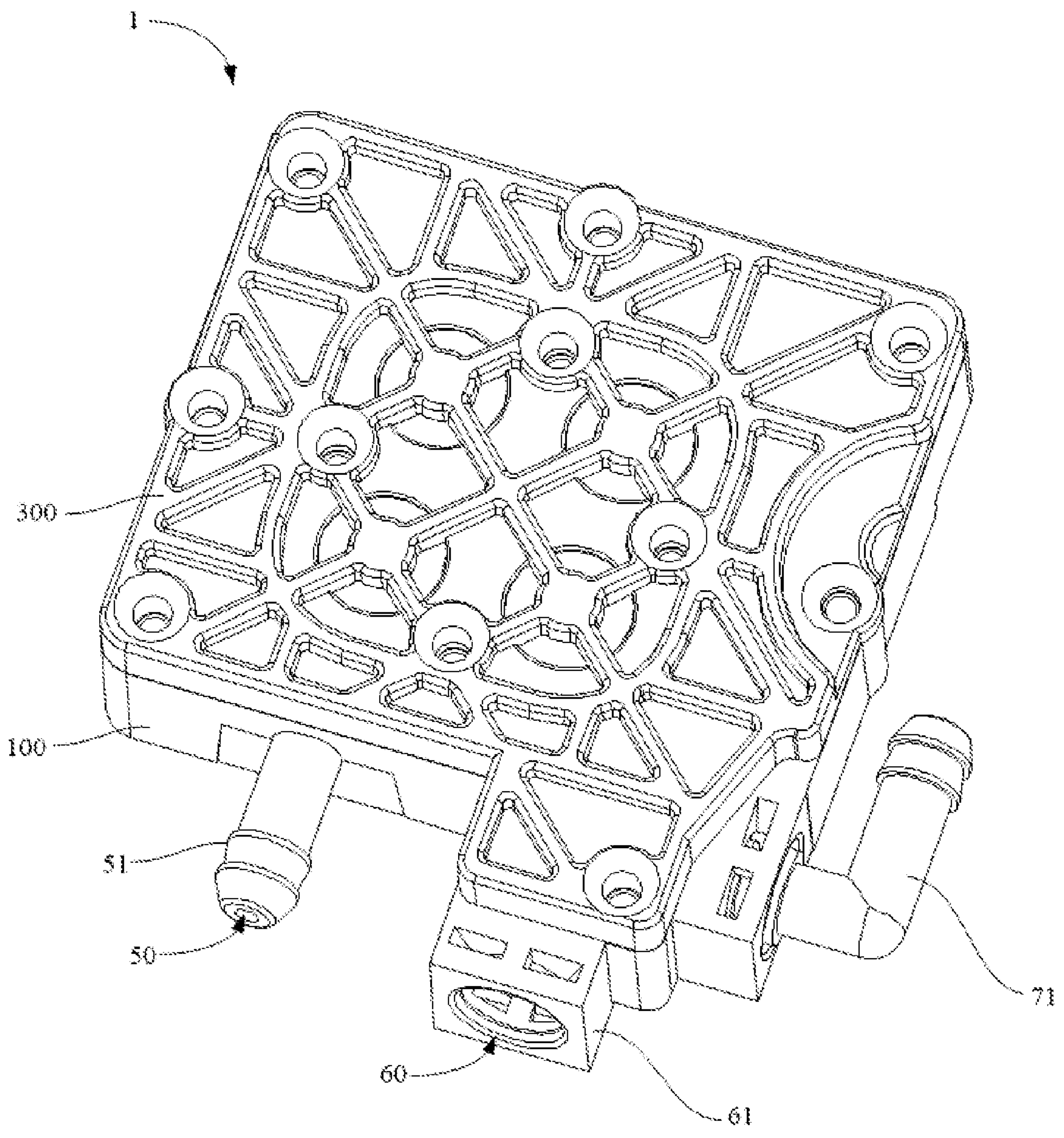
FIG. 6 is a structural view of a sparkling water mixer in the sparkling water machine according to an embodiment of the present application.
Figure 7:
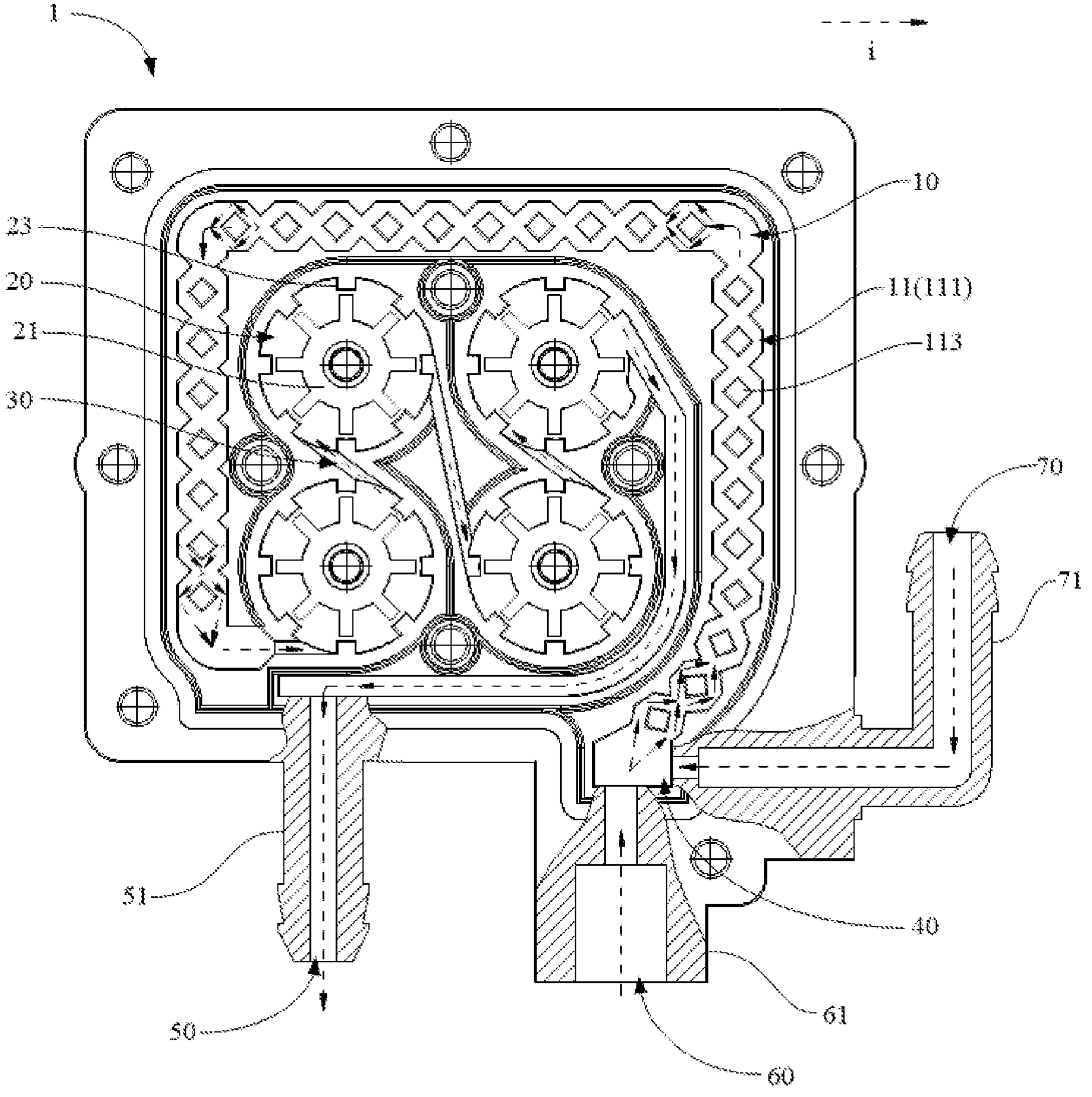
FIG. 7 is a cross sectional view of the sparkling water mixer in the sparkling water machine according to an embodiment of the present application.

Please refer to FIG. 6 and FIG. 7, in an embodiment, the mixed flow path 10 is also formed in the sparkling water mixer 1, and he mixed chamber 20 is communicated with the gas-liquid inlet 213 of the sparkling water mixer 1 through the mixed flow path 10.

The mixed flow path 10 includes at least two mixed sections 11 connected in sequence. The mixed section 11 includes at least two sub flow paths 111 connected in parallel. Inlets of each of the sub flow paths 111 in the same mixed section 11 are communicated with each other to form the inlet end 115 of the mixed section 11, and outlets of each of the sub flow paths 111 are communicated with each other to form the outlet end 117 of the mixed section 11.

In an embodiment, the mixed flow path 10 and at least one mixed chamber 20 sequentially communicated are formed in the sparkling water mixer 1. When two or more mixed chambers 20 are provided, each of the mixed chambers 20 is sequentially communicated along the gas-liquid flow direction i, the outlet of the mixed flow path 10 is communicated with the mixed chamber 20 at the front end, and the mixed chamber 20 at the rear end of the flow route is communicated with the liquid outlet 50 of the sparkling water mixer 1. In an embodiment, a liquid outlet connector 51 is provided at the liquid outlet 50 to facilitate the connecting pipeline to output the sparkling water.

The mixed flow path 10 includes at least two mixed sections 11 sequentially communicated. Each of the mixed sections 11 includes at least two sub flow paths 111 connected in parallel. The parallel connection of each of the sub flow paths 111 means that the inlet of each of the sub flow paths 111 is communicated with each other, and the outlet of each of the sub flow paths 111 is communicated with each other. In this way, after entering the mixed section 11 from the inlet end 115 of the mixed section 11, the gas-liquid mixture will be divided by each of the sub flow paths 111 to form at least two gas-liquid mixtures with the same number as the sub flow paths 111. After passing through each of the sub flow paths 111, each of the gas-liquid mixtures will gather with each other and collide with each other at the outlet end 117 of the mixed section 11. The gathered gas-liquid mixture then enters the next mixed section 11 to repeat the previous actions of separation, impact, gathering and collision. During the continuous collision of the gas-liquid mixture, the surface tension of the water in the gas-liquid mixture will decrease, and the contact area between the water and carbon dioxide will become larger, allowing carbon dioxide to dissolve into the water more quickly, and the gas-liquid ratio will be more evenly.

After entering the mixed chamber 20 from the mixed flow path 10, the gas-liquid mixture collides with the impeller 21 and the impacting portion 23 in the mixed chamber 20, which can increase the solubility of the gas in the liquid.

In an embodiment, to form the at least two sub flow paths 111 in the mixed section 11, at least two guiding tubes may be provided and each of the guiding tube is formed with the sub flow path 111. Alternatively, a flow channel such as a flow groove may be provided, and at least one diverter 113 is provided in the flow channel to separate the flow path into at least two sub flow paths 111.

Please refer to FIG. 7, in an embodiment, at least one sub flow path 111 has a diverting section 1111 and a gathering section 1113 sequentially communicated along the flow direction i. The diverting section 1111 gradually moves away from other sub flow paths 111 in the same mixed section 11 along the flow direction i. The gathering section 1113 gradually approaches other sub flow paths 111 in the same mixed section 11 along the flow direction i.

In an embodiment, the mixed section 11 includes two sub flow paths 111 connected in parallel, a middle part of at least one sub flow path 111 can be protruded in a direction away from the other sub flow path 111. Of course, the two sub flow paths 111 can both be convex structures. In this way, the convex sub flow path 111 is formed with at least two structures, one of which is the diverting section 1111 and is connected to the inlet end 213 of the mixed section 11, and the other of which is the gathering section 1113 and is connected to the outlet end 117 of the mixed section 11. The diverting section 1111 extends from the inlet 213 end to the gathering section 1113 and gradually moves away from the other sub flow path 111; the gathering section 1113 extends towards the outlet end 117 and gradually approaches the other sub flow path 111. In this way, when the gas-liquid mixture flows out from the gathering section 1113 of the sub flow path 111, under the guidance of the gathering section 1113, the gas-liquid mixture rushes towards the gas-liquid mixture flowing out of other sub flow path 111, increasing the impact among each of the gas-liquid mixtures. It can better reduce the surface tension of the water in the gas-liquid mixture, make each of the gas-liquid mixtures fully collide, and accelerate the dissolution efficiency and uniformity of carbon dioxide.

It should be noted that, in an embodiment, the convex flow path structure can be that the entire sub flow path 111 is the arc flow path 600, or that the diverting section 1111 and the gathering section 1113 are two sections of straight flow paths arranged at an angle. In addition, taking the two sub flow paths 111 as the first sub flow path 111 and the second sub flow path 111, it is defined that the first sub flow path 111 has two sidewalls arranged oppositely. One sidewall of the first sub flow path 111 is close to the second sub flow path 111, and the other sidewall of the is first sub flow path 111 is away from the second sub flow path 111. A middle part of the sidewall of the first sub flow path 111 close to the second sub flow path 111 can be protruded in a direction away from the second sub flow path 111, while the sidewall of the first sub flow path 111 away from the second sub flow path 111 is not restricted. The first sub flow path 111 may also be provided with the diverting section 1111 gradually away from the second sub flow path 111 and the gathering section 1113 gradually close to the second sub flow path 111.

If the mixed section 11 includes three or more sections of sub flow path 111, at least one of the sub flow paths 111 located on both sides of the edge can be the convex flow path structure, and all of the sub flow paths 111 located in the middle can be the straight flow path structures. The sub flow path 111 located between any two sections of the sub flow paths 111 can be a flow path structure in which both ends are expanded and the middle is contracted. Of course, at least one of the sub flow paths 111 located on both sides can be the convex flow structure, and any sub flow path 111 in the middle can be the flow path structure in which both ends are expanded and the middle is contracted.

Figure 11:
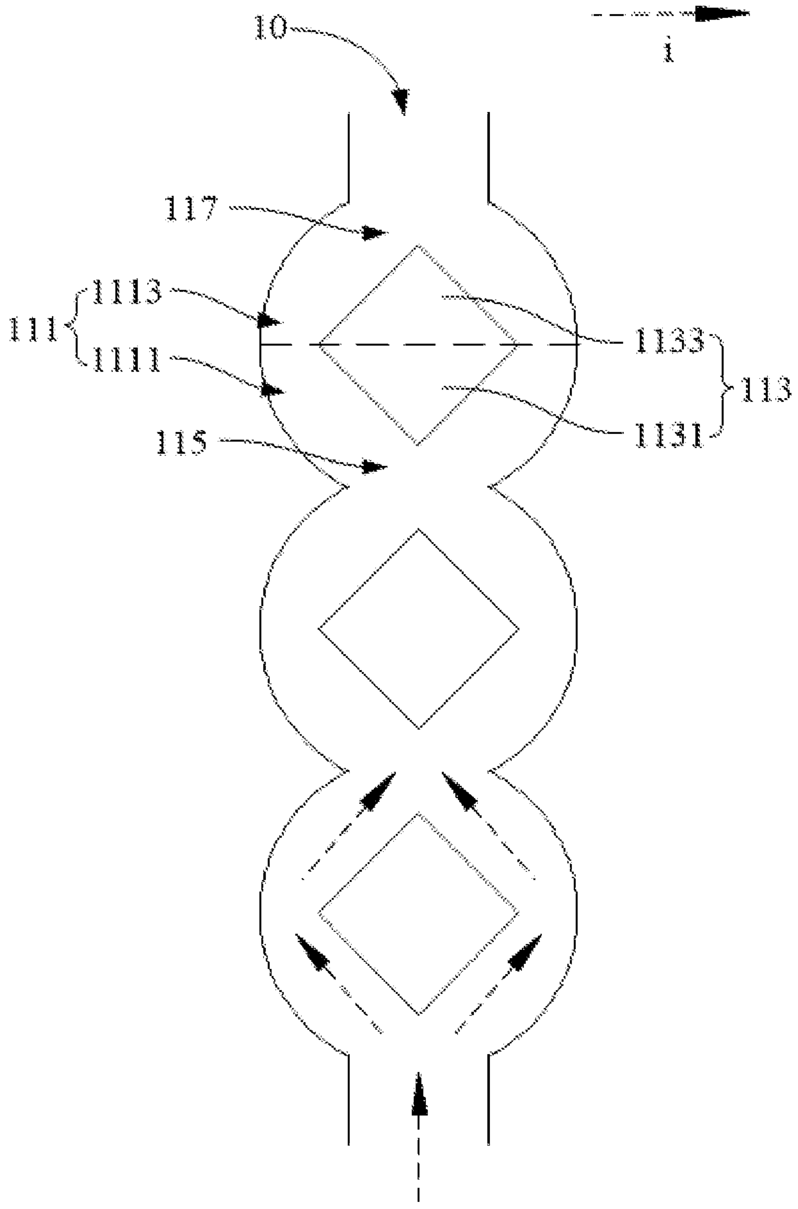
FIG. 11 is a structural view of the mixed flow path of the sparkling water mixer in the sparkling water machine according to an embodiment of the present application.
Figure 12:
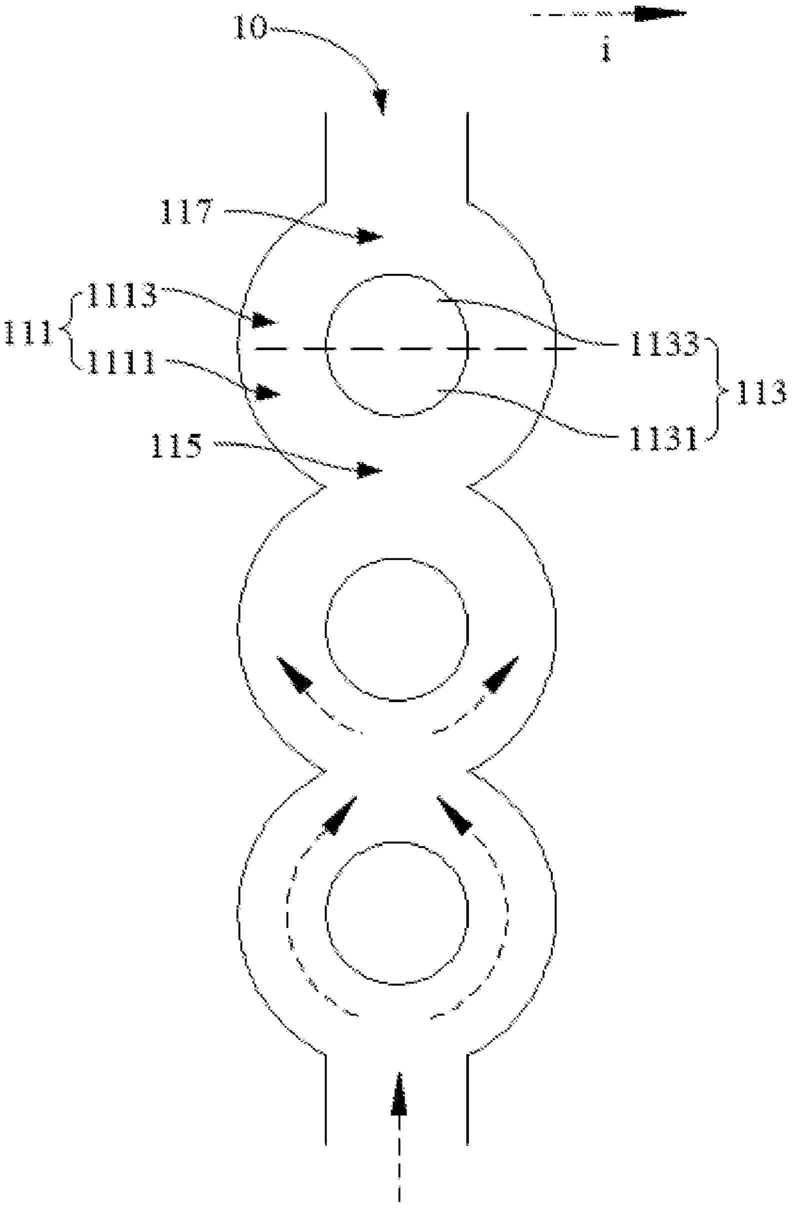
FIG. 12 is a structural view of the mixed flow path of the sparkling water mixer in the sparkling water machine according to an embodiment of the present application.
Figure 13:
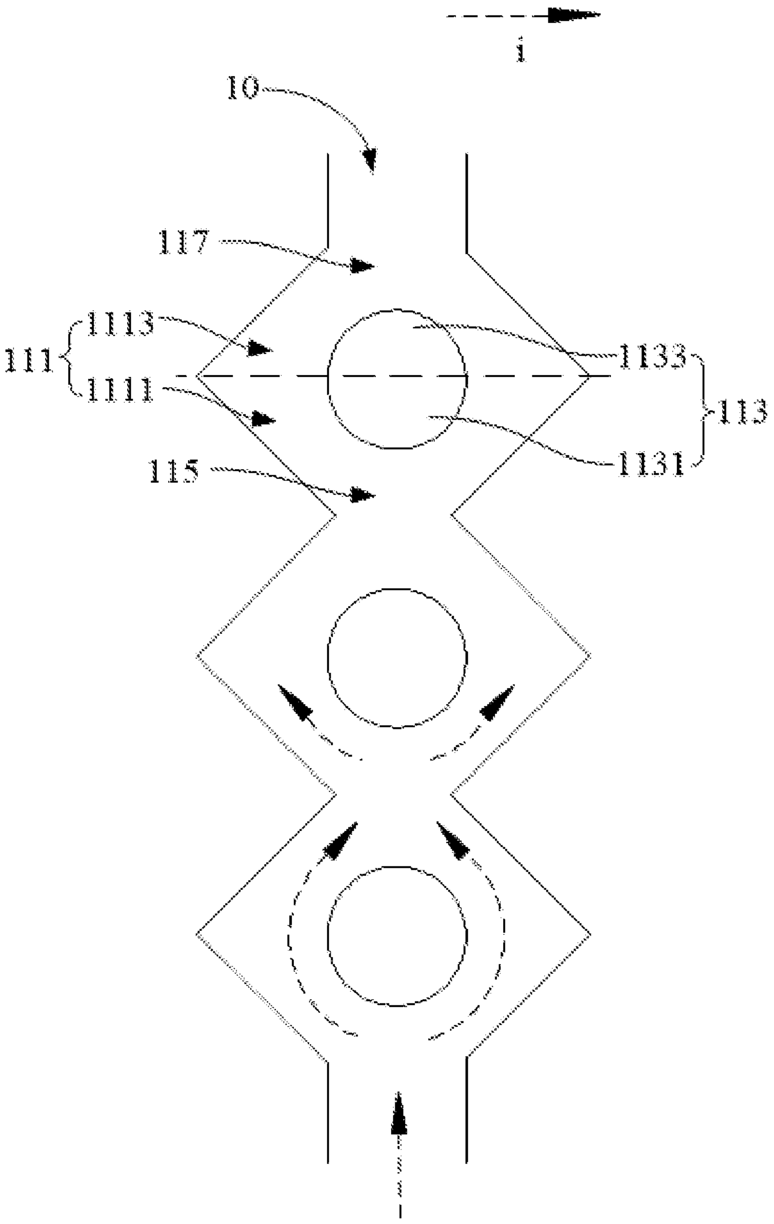
FIG. 13 is a structural view of the mixed flow path of the sparkling water mixer in the sparkling water machine according to an embodiment of the present application.

Please refer to FIG. 11 to FIG. 13, in an embodiment, at least one diverter 113 is provided in the mixed section 11, and both sides of each of the diverters 113 are formed with the sub flow paths 111.

In an embodiment, the mixed section 11 is roughly a trough structure, and the mixed section 11 is defined to have a width direction, and the width direction is an arrangement direction of each of the sub flow paths 111 in the mixed section 11. At least one diverter 113 is provided in the mixed section 11. The diverter 113 is separated between the inlet 213 end of the mixed section 11 and the outlet end 117 of the mixed section 11 along the flow direction i, so that the sub flow path 111 is formed on both sides of the diverter 113. Compared with the method of arranging multiple pipelines to form the sub flow path 111, setting the mixed section 11 as a complete flow path and arranging the structure of the diverter 113 in the flow path makes the sub flow path 111 not easily deformed and makes the structure more stable.

Figure 8:
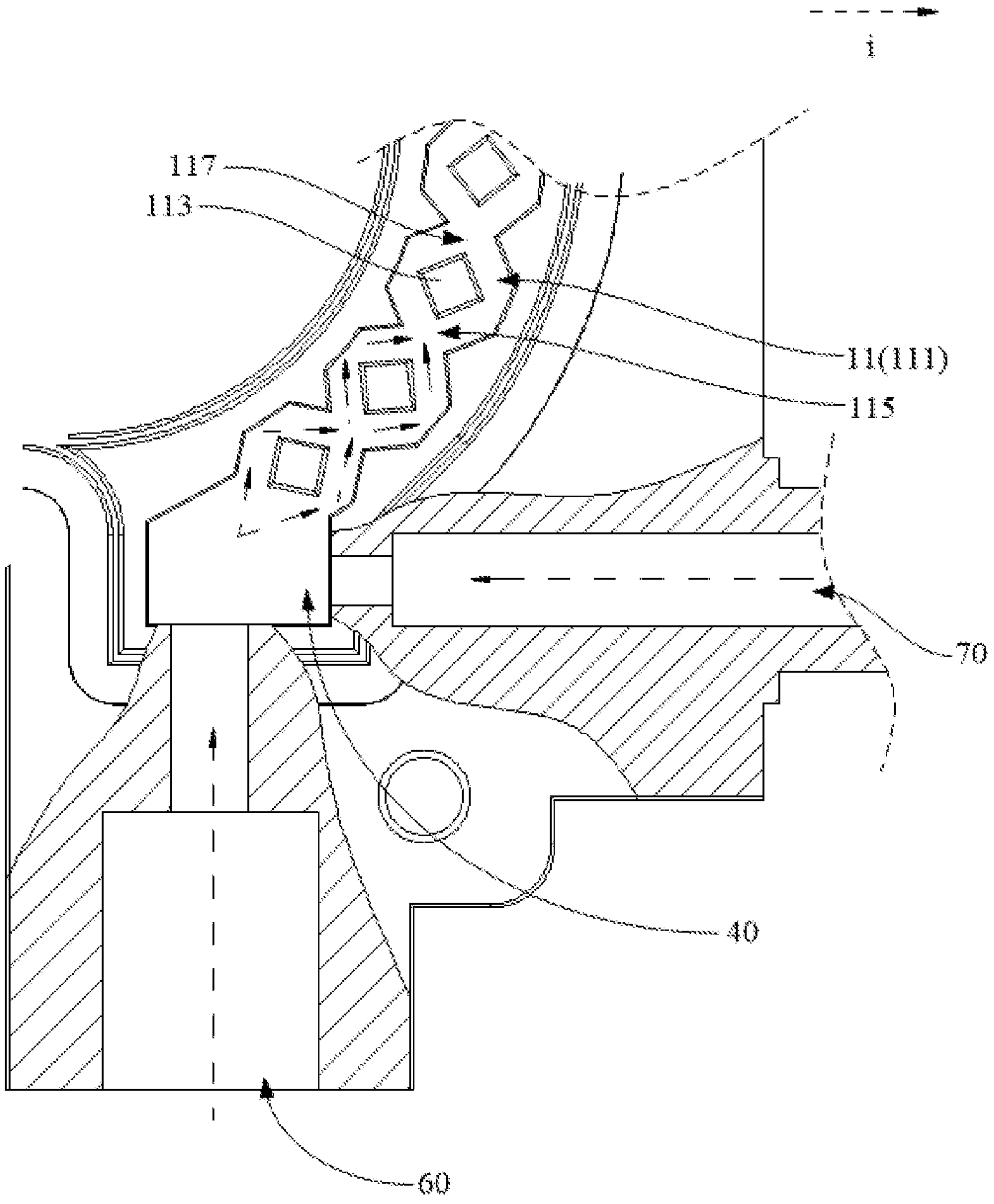
FIG. 8 is an enlarged view at an entrance of a mixed flow path in FIG. 2.

Please refer to FIG. 7 and FIG. 8, in an embodiment, the diverter 113 is provided with a diverting portion 1131 and a gathering portion 1133 connected in sequence along the flow direction i. The width of the diverting portion 1131 gradually increases from the inlet end 115 to the gathering portion 1133, and the width of the gathering portion 1133 gradually decreases from the diverting portion 1131 to the outlet end 117.

The diverter 113 includes the diverting portion 1131 and the gathering portion 1133 connected in sequence along the flow direction i. The width of the diverting portion 1131 gradually decreases along the flow direction i. The diverting portion 1131 can be configured as an angular structure, or the diverting portion 1131 can be configured as an arc structure protruding toward the open end. In this way, when flowing to the diverter 113, the gas-liquid mixture will be diverted by the diverting portion 1131. The diverted gas-liquid mixture flows to the sub flow path 111 on both sides of the diverting portion 1131. During this process, the gas-liquid mixture will impact the diverter 113, which can also reduce the surface tension of the water in the gas-liquid mixture, thereby accelerating the dissolution speed and amount of carbon dioxide, and also making the gas and liquid mix evenly.

The width of the gathering portion 1133 gradually decreases along the flow direction i. The gathering portion 1133 can be configured as an angular structure, or the gathering portion 1133 can be configured as an arc structure protruding toward the open end, so that the gathering section 1113 is formed in the sub flow path 111 corresponding to the gathering portion 1133. When the gas-liquid mixture flows out from the gathering section 1113 of the sub flow path 111, under the guidance of the gathering section 1133, the gas-liquid mixture rushes towards the gas-liquid mixture flowing out of other sub flow paths 111, which increases the impact force among each of the gas-liquid mixtures. It can better reduce the surface tension of water in the gas-liquid mixture, allow each of the gas-liquid mixtures to fully collide, and accelerate the dissolution efficiency and uniformity of carbon dioxide.

In addition, in an embodiment of the present application, a plurality of diverters 113 arranged in an array can also be provided in the mixed section to achieve multiple diverting and impact gathering and improve the dissolution effect.

Please refer to FIG. 11 and FIG. 12, in an embodiment, the sidewall of the diverter 113 facing the sub flow path 111 is a convex folding surface or the arc surface 421.

In an embodiment, the diverting portion 1131 and the gathering portion 1133 of the diverter 113 can be transitioned through an arc at the connection position, which can also be transitioned through a folding surface. The sidewall of the diverting portion 1131 can be directly intersected with the sidewall of the gathering portion 1133 to form an edge. In this way, the gas-liquid mixture can flow smoothly into the gathering portion 1133 along the arc-shaped transition area, and the flow resistance is reduced Referring to FIG. 11 and FIG. 12, in an embodiment, the end portion profile of the diverting portion 1131 toward the inlet end 115 is a tip end or the arc surface.

In an embodiment, the end portion profile of the diverting portion 1131 toward the inlet section may be the tip end. In this way, when flowing to the diverter 113, the gas-liquid mixture can flow to both sides of the diverter 113 along the tip end, which prevents part of the gas-liquid mixture from rebounding and flowing back when the gas-liquid mixture impacts the diverter 113. In addition, in an embodiment, the end portion profile of the diverting portion 1131 toward the inlet end 115 can be configured as the arc surface. In this way, the impact area between the gas-liquid mixture and the diverter 113 can be increased to improve the solubility at the diverter 113, and the gas-liquid mixture will also be diverted by the arc surface 421 to avoid the problem of rebound and backflow.

Referring to FIG. 11 and FIG. 12, in an embodiment, the end portion profile of the gathering portion 1133 toward the outlet end 117 is the tip end or the arc surface.

In an embodiment, the end portion profile of the gathering portion 1133 facing the outlet end 117 may be the tip, so that the gas-liquid mixture will be guided to the outlet end 117 by the sidewall of the gathering portion 1133 when flowing out the sub flow path 111, which prevents part of the gas-liquid mixture from flowing back at the end portion of the gathering portion 1133. In an embodiment, the end portion of the tip end or the profile of the entire gathering portion 1133 can also be arranged as the arc surface to avoid stress concentration problems at the end portion of the gathering portion 1133 and improve the structural strength and stability.

To sum up, the profile of the diverter 113 in the embodiment of the present application can be a circle, an ellipse, a rhombus, a hexagon, a polygon, an oval, a water drop shape, and other regular or irregular structures.

Please refer to FIG. 11 to FIG. 13, in an embodiment, the cross section of inlet end 115 gradually expands along the flow direction i;

and/or, the cross section of the outlet end 117 gradually decreases along the flow direction i.

In an embodiment, the cross section of the inlet end 115 of the mixed section 11 gradually expands along the flow direction i. In this way, when the gas-liquid mixture enters the mixed section 11, the flow speed is reduced and the gas-liquid mixture is dispersed, which can reduce the surface tension and increase the air-liquid contact area. It can not only facilitate the gas-liquid mixture to be evenly distributed into each of the sub flow paths 111, but also improve the dissolution efficiency and solubility of the gas in the liquid, and improve the uniformity of the gas-liquid distribution in the gas-liquid mixture.

In an embodiment, the cross section of the outlet end 117 of the mixed section 11 gradually decreases. In this way, each of the gas-liquid mixtures flowing out from each of the sub flow paths 111 can be fully impacted and contacted, and the flow speed of the gas-liquid mixture can be increased, which improves the dissolution efficiency and solubility of the gas in the liquid, and improves the uniformity of the gas-liquid distribution in the gas-liquid mixture.

The cross section of the inlet end 115 can gradually decrease along the flow direction i; or the cross section of the outlet end 117 can gradually decrease along flow direction i; or the cross section of the inlet end 115 and the cross section of the outlet end 117 can gradually decrease along the flow direction i. In addition, the sidewall of inlet end 115 and the sidewall of outlet end 117 can be connected through the folding surface or the arc surface 421. As a result, the edge contour of the mixed section 11 forms polygonal structures such as triangles, rhombuses, hexagons, circles, ovals, drop-shaped shapes, oblongs, and other regular or irregular structures.

Please refer to FIG. 7 and FIG. 8, in an embodiment, the sparkling water mixer 1 also includes a premixing chamber 40 communicated with the inlet end 115, and the sparkling water mixer 1 is provided with a gas inlet 60 and a liquid inlet 70 communicated with the premixing chamber 40.

In an embodiment, the sparkling water mixer 1 is provided with the premixing chamber 40 located at the inlet end 115 of the mixed flow path 10, and the sparkling water mixer 1 is provided with the gas inlet 60 and the liquid inlet 70 communicated with the premixing chamber 40. In this way, the gas and the liquid are mixed through the premixing chamber 40 to form the gas-liquid mixture, and the gas-liquid mixture enters the mixed flow path 10, which is beneficial for improving the uniformity of the gas-liquid distribution. Moreover, when the sparkling water mixer 1 is applied, the sparkling water mixer 1 can be directly connected to the gas supply structure and the water supply structure, which improves the convenience of using the sparkling water mixer 1.

In an embodiment, a liquid inlet connector 71 is provided at the liquid inlet 70 to facilitate connection to the water supply structure. A gas inlet connector 61 can also be provided at the gas inlet 60 to facilitate the connection to the gas supply structure.

In an embodiment, a cross section of a flow channel in a throttle valve gradually increases, allowing the pressure of the sparkling water to be slowly released. Therefore, when the high-pressure chaotic fluid pressurize by collision in the sparkling water mixer 1 flows out from the small hole through the apparatus, the collision is reduced and the pressure changes smoothly from high to low, which reduces the release of carbon dioxide gas in the sparkling water.

Referring to FIG. 7, in an embodiment, the mixed flow path 10 is provided around the outside of mixed chamber 20.

In an embodiment, the mixed flow path 10 is formed in the periphery of the formation area where the mixed chamber 20 is opened. The mixed flow path 10 may be located at part of the edge of the formation area, or may be completely surrounding the entire formation area. In this way, the structural layout of the sparkling water mixer 1 is compact, which can fully extend the length of the mixed flow path 10 and increase the air-liquid mixing effect while reducing the volume of the sparkling water mixer 1 to achieve a small-volume structural configuration.

Please refer to FIG. 7, in an embodiment, the sparkling water mixer 1 is provided with at least two mixed chambers 20 communicated in sequence. The communicating channel 30 between the two adjacent mixed chambers 20 gradually tapers along the flow path direction.

In an embodiment, at least two mixed chambers 20 sequentially communicated are formed in the sparkling water mixer 1. The outlet of the mixed flow path 10 is communicated with the mixed chamber 20 at the front end. The mixed chamber 20 at the rear end along the flow direction i is communicated with the liquid outlet 50 of the sparkling water mixer 1. Each of the mixed chambers 20 is provided with the impeller 21 and the impacting portion 23.

It can be understood that, as in the previous embodiment, the gas-liquid mixture can drive the impeller 21 in the mixed chamber 20 to rotate along the flow direction i of the gas-liquid mixture when entering the mixed chamber 20. Due to a centrifugal force, the gas-liquid mixture will be thrown from the impeller 21 and impacted on the impacting portion 23 located in the periphery of the impeller 21, and an instant pressure several times the normal pressure is generated, thereby increasing the solubility of carbon dioxide. That is, a single mixed chamber 20 is enough to increase the solubility of carbon dioxide. If more than one mixed chambers 20 are connected in series, and the gas-liquid mixture entering the sparkling water mixer 1 can repeat the process of increasing the solubility of carbon dioxide many times. As a result, carbon dioxide can be further dissolved in the liquid, thereby obtaining the sparkling water with a high solute concentration.

Since each of the mixed chambers 20 carries out the above-mentioned process of increasing the dissolution of carbon dioxide, carbon dioxide continues to dissolve in the liquid, the fluid volume in the mixed chamber 20 will continue to decrease, and the pressure in the mixed chamber 20 will also decrease accordingly. In an embodiment, the cross sectional area of the communication channel 30 between two adjacent mixed chambers 20 gradually decreases along the flow direction i. Under a certain condition, since the cross section of the pipe diameter the liquid flowing through gradually decreases, the flow speed increases. According to Bernoulli's principle, the flow speed increases at the outlet where the cross section decreases, which increases the speed of the impeller 21 and the impact kinetic energy, and improve the solubility of the gas-liquid mixture in the next mixed chamber 20.

The cross sectional area of the communicating channel 30 will gradually decrease along the flow direction i of the gas-liquid mixture. When the inner diameter of the communicating channel 30 gradually decreases, the flow speed of the liquid in the channel will become faster. Therefore, the gas-liquid mixture flowing through the communicating channel 30 has a faster flow speed and the impact force, and can maintain a motion and further accelerate in the flow direction i. Therefore, after leaving the channel, the gas-liquid mixture can obtain a higher kinetic energy. When the gas-liquid mixture impacts the blades of impeller 21, the rotation speed of impeller 21 can be increased. In this way, the impeller 21 can more effectively divide and mix the gas phase and liquid phase in the mixed chamber 20, and the gas-liquid mixture impacting the impacting portion 23 can also instantly cause a greater momentum change, so that carbon dioxide has a better dissolving effect.

Figure 9:
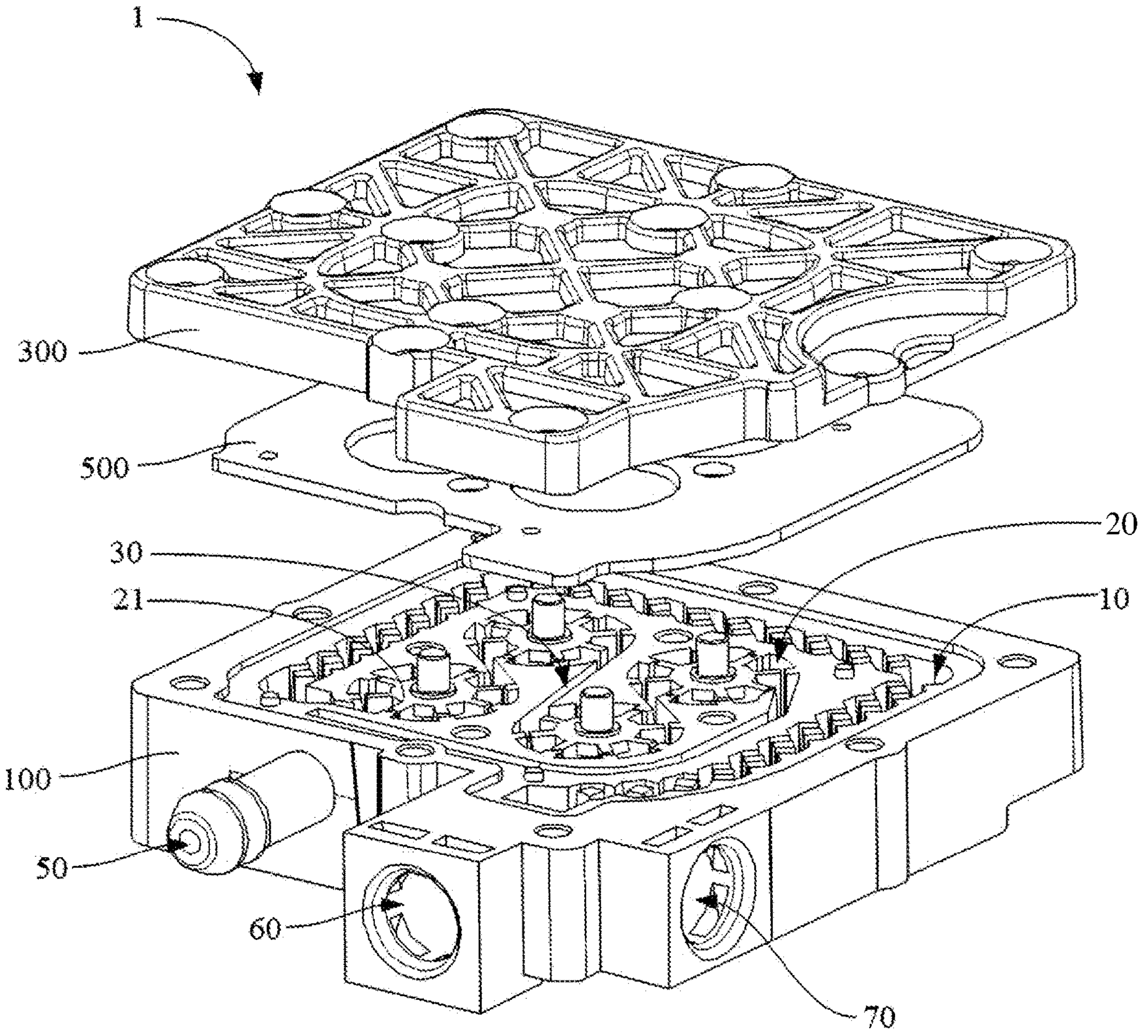
FIG. 9 is an exploded view of the sparkling water mixer in the sparkling water machine according to an embodiment of the present application.
Figure 10:
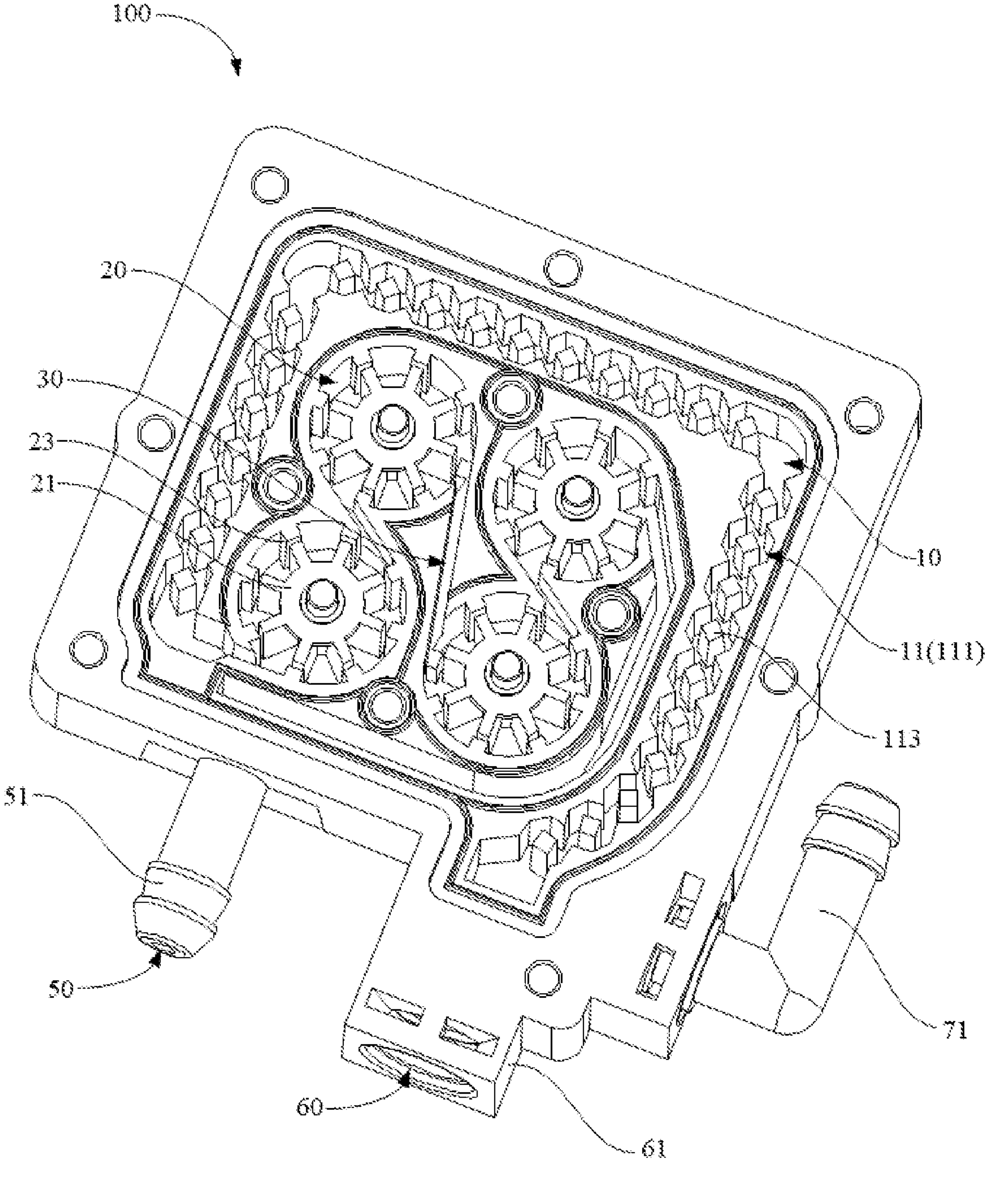
FIG. 10 is a schematic structural view of a base of the sparkling water mixer in FIG. 4.

Please refer to FIG. 6 and FIG. 9, in an embodiment, sparkling water mixer 1 includes: a base 100, a cover body 300 and a sealing member 500.

A surface of the base 100 is concavely provided with the mixed flow path 10 and the mixed chamber 20, and an outer wall of base 100 is provided with the gas inlet 60 and the liquid inlet 70 communicated with the mixed flow path 10 and the liquid outlet 50 communicated with the mixed chamber 20.

The cover body 300 is located on the surface of base 100 and covers the mixed flow path 10 and the mixed chamber 20.

The sealing member 500 is sandwiched between the base 100 and the cover body 300, and is arranged around a circumferential direction of the mixed flow path 10 and the mixed chamber 20.

In an embodiment, the sparkling water mixer 1 includes the base 100 and the cover body 300. The surface of the base 100 is concavely formed with a trough structure of the mixed flow path 10 and the mixed chamber 20, and the cover body 300 covers the base 100 and closes an opening on the surface of the base 100. The base 100 is also provided with the gas inlet 60 and the liquid inlet 70 communicated with the mixed flow path 10, and the base 100 is detachably connected to the cover body 300. The base 100 can be connected to cover body 300 through threads, or fasteners can be provided to connect the base 100 and the cover body 300. The fasteners can be configured as bolts, which will not be described in detail here.

In an embodiment, the cover body 300 is fixedly connected to the base 100 by bolts. The cover body 300 is provided with a countersunk hole that is larger than the outer diameter of the bolt. The end surface of the base 100 facing the cover body 300 is provided with a corresponding screw hole. The bolt can be placed in the countersunk hole and connected to the base 100 by threads to lock the cover body 300 on the base 100. In this way, the sparkling water mixer 1 has a stable installation structure, and a better stability and reliability.

Further, a sealing member 500 is provided between the cover body 300 and the base 100, and the sealing member 500 is provided around the ports of the mixed flow path 10 and the mixed chamber 20 on the surface of the base 100. The sealing member 500 may be a sealant, a rubber or a silicone, etc. In this way, the sparkling water mixer 1 can have a better air tightness, which avoids the air leakage or the liquid leakage, thereby ensuring the pressure in the mixed flow path 10 and mixed chamber 20, and improving the dissolution effect of carbon dioxide.

In an embodiment, the sealing member 500 is provided with a through hole, and the bolts can pass through the through hole and be connected to the base 100, so that the sealing member 500 is firmly installed between the base 100 and the cover body 300. In this way, the sealing member 500 can be fixed to improve the positional stability of the sealing member 500 and prevent the sealing member 500 from slipping or loosening, thus ensuring the sealing performance of the sparkling water mixer 1. In an embodiment, a recess can also be provided on the end surface of the base 100 facing the cover body 300. The recess is arranged around the periphery of an accommodating chamber. The sealing member 500 is provided in the recess and can be abutted against the end surface of the cover body 300 facing the base 100. Of course, the recess can also be provided on the cover body 300, and the sealing member 500 is provided in the recess and abutted against the end surface of the base 100 facing the cover body 300. The specific implementation can be set according to actual needs, which is not limited here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A pressure regulator, comprising:

an arc flow path, wherein a cross section of the arc flow path is configured to gradually increase from an input end of the arc flow path to an output end of the arc flow path, and the input end of the arc flow path is communicated with an inlet of the pressure regulator;

a transiting chamber respectively communicated with the output end of the arc flow path and a discharging port of the pressure regulator;

a shell formed with a pressure regulating chamber and the transiting chamber, wherein the shell is provided with the inlet and the discharging port, and the pressure regulating chamber is communicated with the inlet; and a guiding member provided in the pressure regulating chamber, wherein an outer sidewall of the guiding chamber is fitted with an inner sidewall of the pressure regulating chamber;

wherein at least one of the outer sidewall of the guiding member and the inner sidewall of the pressure regulating chamber is provided with a spiral groove to form a spiral flow path between the guiding member and the inner sidewall of the pressure regulating chamber; and the arc flow path is the spiral flow path.

2. The pressure regulator of claim 1, wherein the pressure regulating chamber comprises a pressure regulating section and a guiding section, and the inlet and the pressure regulating section are respectively provided on both sides of the guiding section away from each other;

the guiding member comprises a column guiding portion provided in the pressure regulating section and a tapered guiding portion, the spiral flow path is formed between the column guiding portion and the inner sidewall of the pressure regulating section, and an input end of the spiral flow path is communicated with the guiding section; and the tapered guiding portion is configured to gradually taper in a direction away from the column guiding portion, an end surface of the tapered guiding portion is an arc surface, and the tapered guiding portion is provided in the guiding section and spaced apart from a cavity wall of the guiding section.

3. The pressure regulator of claim 1, wherein a limiting portion is provided in the transiting chamber, and one end of the guiding member away from the inlet is abutted against the limiting portion.

4. The pressure regulator of claim 1, wherein the shell comprises a first shell and a second shell, the first shell is provided with the pressure regulating chamber and the inlet, the second shell is provided with the transiting chamber and the discharging port, and the first shell is sealingly connected to the second shell.

5. The pressure regulator of claim 1, wherein a tangent line of the output end of the arc flow path is tangent to a sidewall of the transiting chamber.

6. The pressure regulator of claim 1, wherein the discharging port is opened on the sidewall of the transiting chamber.

7. The pressure regulator of claim 1, wherein a ratio A of a sectional area of the output end of the arc flow path to a sectional area of the input end of the arc flow path satisfies the following condition: A is greater than or equal to 3.5, and A is less than or equal to 8.

8. The pressure regulator of claim 1, further comprising:
a sparkling structure provided at the discharging port of the pressure regulator.

9. A sparkling water machine, comprising:
a sparkling water mixer formed with a mixed chamber, wherein a rotatable impeller and an impacting portion located in a periphery of the impeller are provided in the mixed chamber; and
the pressure regulator of claim 1, wherein the inlet of the pressure regulator is communicated with a liquid outlet of the sparkling water mixer;
wherein a mixed flow path is formed in the sparkling water mixer, and the mixed chamber is communicated with a gas and liquid inlet of the sparkling water mixer through the mixed flow path; and
the mixed flow path comprises at least two mixed sections connected in sequence, each of the at least two mixed sections comprises two sub flow paths connected in parallel, inlets of each of the two sub flow paths in a same mixed section are communicated with each other to form an input end of each of the at least two mixed sections, and outlets of each of the two sub flow paths in the same mixed section are communicated with each other to form an output end of each of the at least two mixed sections.

10. The sparkling water machine of claim 9, wherein at least one of the two sub flow paths is provided with a diverting section and a gathering section sequentially communicated along a flow direction, the diverting section is configured to gradually move away from other sub flow paths in the same mixed section along the flow direction, and the gathering section is configured to gradually approach other sub flow paths in the same mixed section along the flow direction.

11. The sparkling water machine of claim 9, wherein at least one diverter is provided in each of the at least two mixed sections, and both ends of each of the at least one diverter are respectively formed with the two sub flow paths.

12. The sparkling water machine of claim 9, wherein a cross section of the inlet end is configured to gradually increase along a flow direction.

13. The sparkling water machine of claim 9, wherein a cross section of the outlet end is configured to gradually decrease along a flow direction.

* * * * *